Patented July 12, 1932

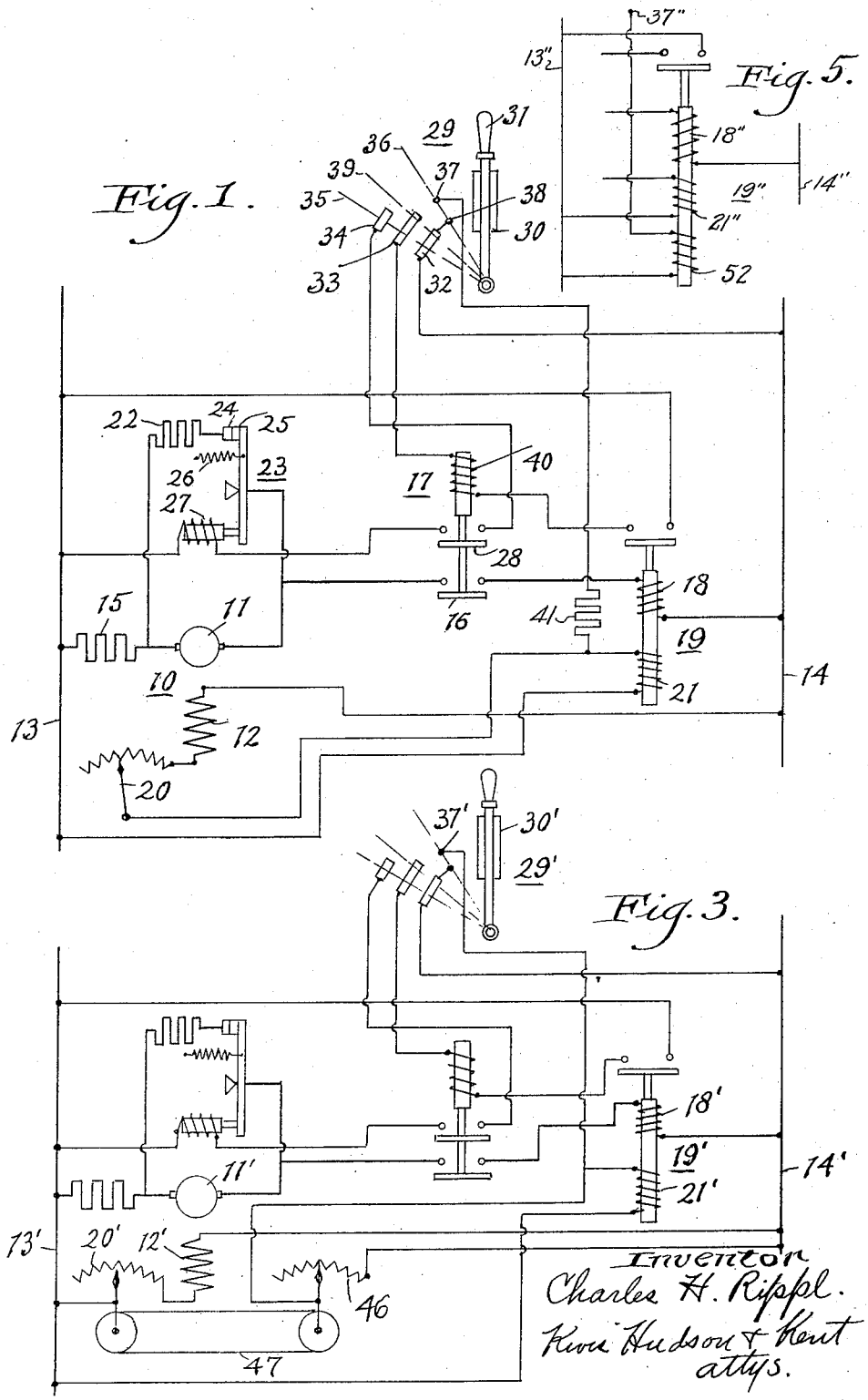

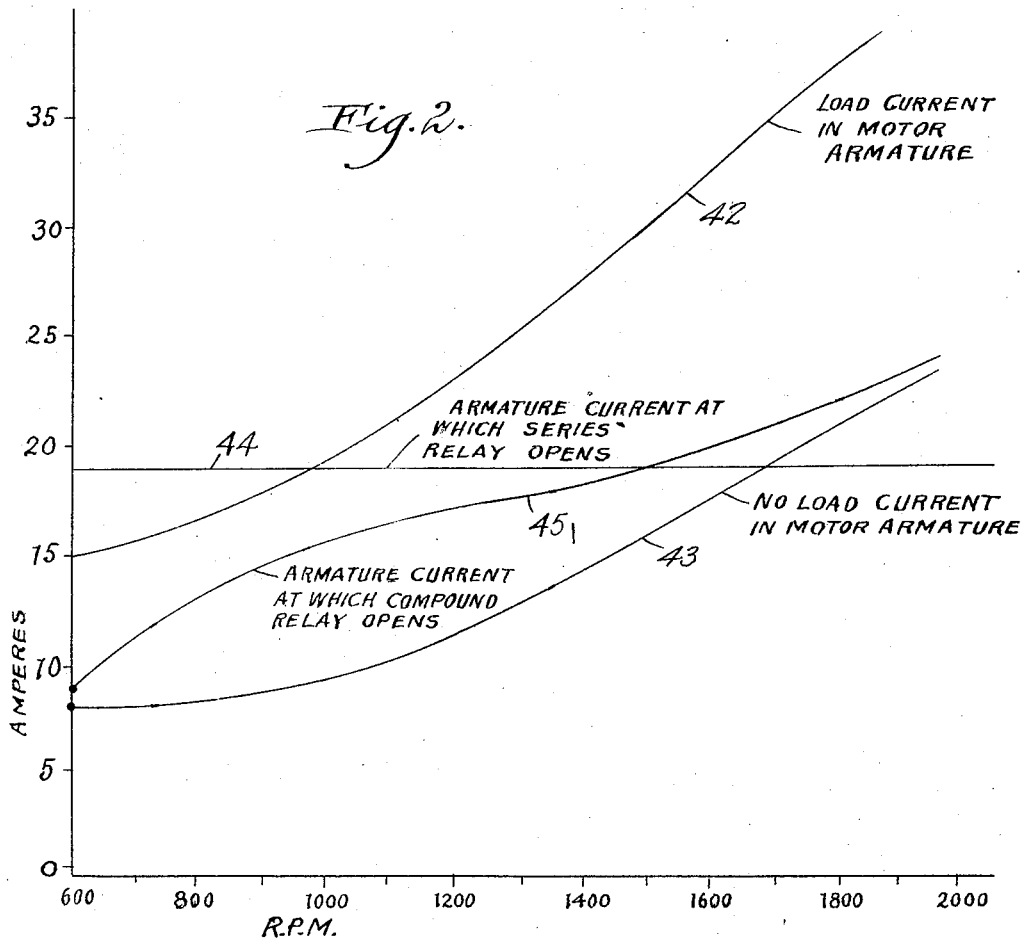
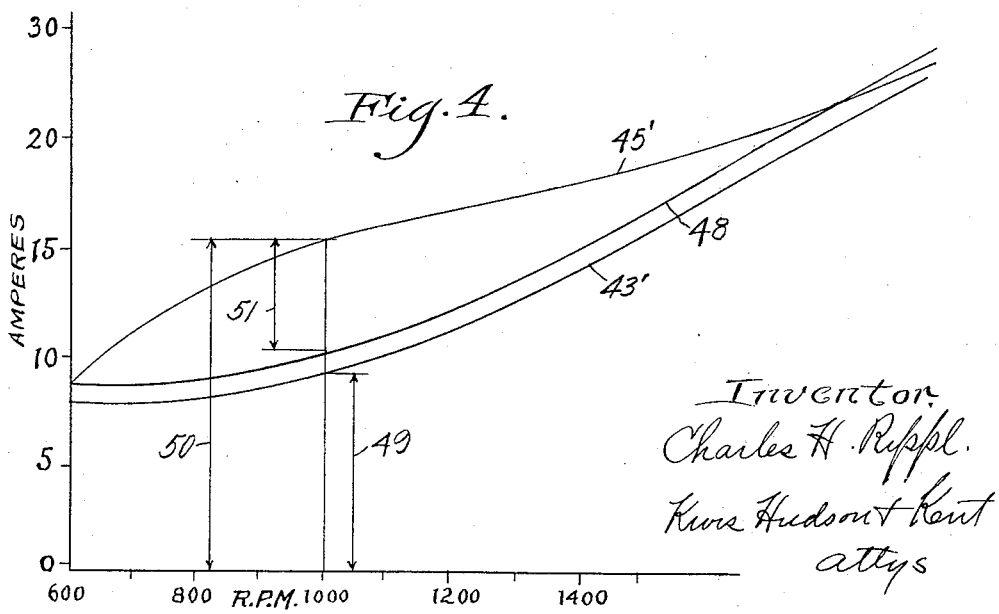

1,867,280

UNITED STATES PATENT OFFICE

CHARLES H. RIPPL, OF EAST CLEVELAND, OHIO, ASSIGNOR TO THE CLARK CONTROLLER COMPANY, OF CLEVELAND, OHIO, A CORPORATION OF OHIO

NO-LOAD RELAY

Application filed March 6, 1930. Serial No. 433,713.

This invention relates to motor control systems, and more particularly to systems of the kind in which means is provided for stopping the motor upon the occurrence of a predetermined change in the load, such as a complete cessation of load.

In the operation of certain machinery the use of a variable speed driving motor is often desirable, because it permits the speed of operation of the machine to be varied to suit the character of the work being done. For example, in wire drawing machinery, it is found desirable to operate the driving motors at different speeds, because a wire of large size must be drawn at a comparatively slow speed, while a wire of smaller size may be drawn at a much higher speed. In the operation of such machinery the load on the motor is sometimes suddenly removed, incident to the breaking of the wire or to the passage of the end of the wire through the die. Upon the occurrence of such a no-load condition the motor must be stopped immediately, to avoid injury to workmen or damage to apparatus. Certain devices have been proposed for stopping the motor under such no-load conditions, but in the operation these devices have not been satisfactory.

It is, therefore, the principal object of this invention to provide an improved motor control system having a master controller and a compound underload relay arranged to stop the motor upon the sudden removal of the load.

The invention may be further briefly summarized as consisting in certain novel combinations and arrangements of parts hereinafter described and particularly set out in the appended claims.

In the accompanying sheets of drawings,

Figure 1 is a diagrammatic view of circuits and apparatus embodying my invention, Figure 2 is a diagrammatic view illustrating graphically various operating conditions.

Figure 3 is a diagrammatic view of another arrangement of circuits and apparatus embodying my invention.

Figure 4 is a diagrammatic view illustrating graphically certain characteristics of the arrangement represented in Fig. 3, and Figure 5 is a fragmentary diagrammatic view representing a modification of the arrangement shown in Fig. 1.

In the drawings, to which I shall now refer in detail, I have illustrated diagrammatically in Fig. 1 an arrangement of circuits and apparatus embodying my invention. In this arrangement I have represented a motor 10, having an armature 11 and a field winding 12, to which direct current is supplied from a suitable source, such as the main supply conductors 13 and 14. In the circuit which includes the armature, I provide a starting resistor 15, which may be of any suitable form. This circuit also includes the movable element 16 of an electromagnetic contactor 17 and the winding 18 of a compound or multiple coil underload relay 19. In the circuit which includes the field winding 12, I provide a suitable rheostat 20 for varying the excitation of the field. This circuit also includes the winding 21 of the compound underload relay 19.

A dynamic braking resistor 22 is connected in shunt relation to the armature of the motor. A contactor 23 having contact points 24 and 25, normally biased towards closed position by the spring 26, controls the flow of current through the resistor. An electromagnet 27 is provided for separating the contact points 24 and 25 against the tension of the spring 26, to thus cut out the dynamic braking resistor when a higher armature speed is desired. It should be noted that the circuit which includes the winding of the electromagnet 27 also includes in series with this winding the element 28 of the contactor 17, which element is rigidly connected to and movable with the contactor element 16.

For starting the motor I provide a master controller 29, having a contact element 30 adapted to be moved from the stop position in which the handle 31 is indicated in full lines, to a running position in engagement with the contacts 32, 33 and 34, and indicated by the dash line 35. Between the stop position and the running position of the element I provide two intermediate positions for this contact element. In the first intermediate position, indicated by the dash line 36, the element engages contacts 37 and 38. In the second intermediate position, indicated by the dash line 39, the element connects the contact members 32 and 33.

In the operation of the device movement of the contact element 30 to the first intermediate position closes the circuit which includes the contacts 37 and 38 and the underload relay winding 21, thus energizing this winding and moving the relay to closed position. The closing of the relay connects the winding 40 of the electromagnetic contactor 17 in circuit with the contacts 32 and 33. Movement of the element 30 to the second intermediate position, into engagement with the contacts 32 and 33, causes the winding 40 to be energized, thus moving the elements 16 and 28 to closed position. The movement of the element 16 closes the armature circuit, thus energizing the winding 18 of the underload relay. The movement of the element 28 to closed position connects the winding of the electromagnet 27 in circuit with the contact 34 of the master controller. It should be noted that the contacts 37 and 38 are so arranged with respect to the contacts 32 and 33 that, upon movement of the element 30 from the first intermediate position to the second intermediate position, this element engages the contacts 32 and 33 before it disengages from contacts 37 and 38. By this arrangement provision is made for keeping the winding 21 energized until the element 16 has closed the armature circuit and thus energized the winding 18 of the relay. Upon further movement of the element 30 to the running position, it moves along contacts 32 and 33 and engages contact 34. Engagement of this element with contact 34 energizes the winding of the electromagnet 27, thus opening the contacts 24 and 25, disconnecting the dynamic breaking resistor 22, and permitting the motor armature to accelerate.

The windings 18 and 21 of the compound underload relay 19 are arranged to assist each other in holding the movable member of the relay in closed position. The relay is so constructed that if the combined magnetic effect of the winding is insufficient to hold the movable member in closed position, this member drops by gravity and opens the circuit which includes the winding 40 of the contactor 17. The deenergizing of the winding of the contactor permits the elements 16 and 28 thereof to drop open, thus opening the armature circuit and the circuit which includes the winding of the electromagnet 27. When the motor is driving a load at slow speed the current flowing through the field winding, and through the winding 21 in series therewith, is comparatively high, and the current flowing through the armature, and through the winding 18 in series therewith, is comparatively low. When the motor is driving a load at high speed these current values are reversed, that is to say, the current flowing through the field and through the winding 21, is comparatively low, while the current flowing through the armature and through the winding 18, is comparatively high. The turns of the windings 18 and 21 are so proportioned that the combined effect of these armature and field current values for different speeds of operation will be to permit the underload relay to drop open at an armature current value which is somewhat lower for low motor speed than it is for high motor speeds, but which is at all speeds above the no-load armature current value.

It will be noted that when the handle of the master controller occupies the position 36, the winding 21 of the relay 19 is connected directly across the main conductors 13 and 14, and to prevent this winding from being burned out, should the handle of the master controller be left in position 36 too long, it may be desirable to provide a resistance element 41 of suitable value.

In Fig. 2 of the drawings I have represented graphically the operation of my compound underload relay, as illustrated in Fig. 1, by comparing it with the operation of a single coil series relay. In this diagram I have shown a curve 42 representing the load current in the motor armature at various motor speeds, and a curve 43 representing the no-load current in the motor armature for various speeds. The curve 44 represents an arbitrary armature current value of 19 amperes, at which a single coil series relay in a given case is adjusted to drop open. From these curves it will be seen that between motor speeds of 600 to 975 revolutions per minute the armature load-current value is under 19 amperes, or, in other words, is insufficient to maintain the series relay in closed position. Between motor speeds of 975 and 1680 revolutions per minute the relay would operate to stop the motor upon sudden removal of the load, but above 1680 revolutions per minute the no-load armature current is over 19 amperes and would prevent the relay from opening upon sudden removal of the load.

Thus if it is desired to operate the motor to drive a load at low speed, it is necessary to adjust a single coil series relay, so that the corresponding armature current will maintain the relay in closed position. Similarly, if it is desired to operate the motor to drive a load at a high speed it is also necessary to adjust a single coil series relay, so that it will not be held shut by the no-load current flowing through the armature after the load has been removed.

In providing my control circuit with an underload relay having a winding in the armature circuit and a winding in the field circuit, I find that by actual test the relay drops open at an armature current valve which is represented by the curve 45. As indicated by this curve it will be readily seen that the underload relay will operate throughout a wide range of motor speeds for stopping the motor upon sudden removal of the load without the need of different adjustments for different speeds of operation. It will also be readily seen from this curve that the armature current valve at which the relay drops open is always above the no-load armature current value, so that the relay may be relied upon to stop the motor upon the occurrence of a no-load condition regardless of the speed at which the motor is operating.

From the relation of the curves 43 and 45, as shown in Fig. 2, it will be noted, that for certain speeds of operation the difference between the no-load armature current and the armature current value at which the relay opens, is greater than it is at other speeds. It is desirable, however, to have the armature current value at which the relay opens only slightly greater than the no-load armature current value for all desired speeds of operation. This desired result is achieved by another form of control circuit which is represented diagrammatically in Fig. 3 and which also embodies my invention.

This control circuit, as illustrated in Fig. 3, differs essentially from that described in detail in connection with Fig. 1, in that the winding 21' of the relay 19' is not connected in the circuit of the field winding 12', but is in a separate circuit which connects the supply conductors 13' and 14' and which includes the rheostat 46. One end of the winding 21' is connected to the contact 37' so that by movement of the element 30' of the master controller 29' this winding can be initially energized for closing the relay in the manner already described in connection with Fig. 1.

Suitable connecting means 47 is provided between the rheostat 46 and the rheostat 20' which controls the shunt field, so that these rheostats may be operated in unison. These rheostats are so proportioned and related that when the field current is decreased to speed up the motor the flow of current through the winding 21' will also be reduced. The decrease in magnetization of the winding 21' will be compensated for by the increased flow of armature current through the winding 18' incident to the decrease in the strength of the field. Thus with this arrangement the difference between armature current values at which the relay will open and the no-load armature current values will be substantially constant for all speeds of operation.

This result is illustrated graphically in Fig. 4 in which the curve 43' represents the no-load current values in the armature 11', and in the winding 18' in series therewith, at different speeds of operation. The curve 48 represents the armature current values at which the relay will open when the current flowing through the winding 21' is varied by the rheostat 46 being operated in unison with the field rheostat 20'. The curve 45' represents the armature current values at which the relay of Fig. 1 will open, and is plotted for comparison with the curve 48. To further illustrate the operation of this control circuit, assume as an example, a motor operating speed of 1000 revolutions per minute. At this speed the magnetizing current in the series winding 18' of the relay is represented by the distance 49, the sum of the magnetizing currents of the winding 18' and the winding 21' is represented by the distance 50, and the distance 51 represents the effect of the rheostat 46.

In Fig. 5 of the drawings I have shown a modification of a portion of the control circuit shown in Fig. 1. The relay 19" shown in the modification corresponds to the relay 19 of Fig 1 having a winding 18" in series with the armature, a winding 21" in series with the shunt field, and a third winding 52. The windings 18" and 21" are arranged to assist each other in holding the movable member in closed position against the action of gravity. The winding 52 is connected to the supply conductor 13" and to a contact 37" of the main controller corresponding with contact 37 of Fig. 1. In operation the winding 52 is energized upon initial movement of the controller handle, to close the relay. Further movement of the controller handle results in the windings 18" and 21" being energized in a manner similar to that explained in connection with the windings 18 and 21 of Fig. 1, and cuts out the winding 52 which performs no further function.

While I have illustrated and described my invention in a detailed manner, it should be understood, however, that I do not intend to limit myself to the precise details shown and described, but regard my invention as including such changes and modifications as do not involve a departure from the spirit of the invention and the scope of the appended claims.

Having thus described my invention what I claim is:

1. In a control system for direct current motors, the combination of an electric motor, a circuit for said motor, master switching means, an underload relay having windings in additive relation, one of said windings being in said circuit and another in circuit with initial contacts of said master switching means, and an electromagnetic contactor for closing said motor circuit, said contactor having a winding in circuit with contacts of said relay and with other contacts of said master switching means.

2. In a control system for direct current motors, the combination of an electric motor, a circuit which includes the armature of said motor, a circuit which includes the field of said motor, an electromagnetic contactor for closing the armature circuit, an underload relay controlling the actuation of said contactor, said underload relay having a winding in said armature circuit and a winding in the field circuit, and master switching means having contact means for energizing one of said windings.

3. In a control circuit for direct current motors, the combination of an electric motor, a circuit for said motor, an underload relay having a plurality of windings in additive relation including a series winding in said circuit and another winding in an independent circuit, a rheostat in said independent circuit, a shunt field circuit for said motor, a rheostat in said field circuit, and control means for actuating said rheostats simultaneously.

4. In a control circuit for direct current motors, the combination of an electric motor, a circuit for said motor, an underload relay having a plurality of windings in additive relation including a series winding in said circuit and another winding in an independent circuit, a master switching means having contact means for initially energizing the second mentioned winding to close the relay, a rheostat in said independent circuit, a shunt field circuit for said motor, a rheostat in said field circuit, and means connecting said rheostats for simultaneous actuation.

5. In a control circuit for direct current motors, the combination of an electric motor, a circuit for said motor, an electromagnetic contactor for closing said circuit, an underload relay for controlling the actuation of said contactor, said relay having a winding in said circuit and a second winding for initially closing the relay, and master switching means having initial contacts for energizing said second winding.

6. In a control circuit for direct current motors, the combination of an electric motor, a circuit for said motor, an electromagnetic contactor for closing said circuit, an underload relay for controlling the actuation of said contactor, said relay having a winding in said circuit and a second winding for initially closing the relay, master switching means having initial contacts for energizing said second winding, and means for varying the ampere-turns of said second winding.

7. In a control system for direct current motors, the combination of an electric motor, a circuit which includes the armature of said motor, a circuit which includes the field winding of said motor, an electromagnetic contactor for closing the armature circuit, an underload relay for controlling the actuation of said contactor, said underload relay having a winding in said armature circuit and a second winding, a master controller having contact means for energizing said second winding, and means for simultaneously varying the ampere-turns of said field winding and of said second winding.

In testimony whereof, I hereunto affix my signature.

CHARLES H. RIPPL.